Patented June 23, 1936

2,045,049

UNITED STATES PATENT OFFICE 2,045,049

PROCESS FOR THE MANUFACTURE OF NEW TANNING MATERIALS

Hermann Noerr and Gustav Mauthe, Leverkusen-I. G.-Werk, Germany, assignors to I. G. Farbenindustrie Aktiengesellschaft, Frankfort-on-the-Main, Germany No Drawing. Application August 7, 1935, Serial No. 35,201. In Germany August 22, 1934

15 Claims. (Cl. 149—4)

The present invention relates to the manufacture of new tanning materials.

It is known that the liquors containing lignin sulfonic acid which are obtained in the manufacture of cellulose by the sulfite process and are generally called sulfite cellulose waste liquors, have some tanning action on animal hides and skins. Various endeavours have been made towards utilizing the organic substances contained therein in the leather industry. However, the sulfite cellulose waste liquors have proved to be totally unsuited for the treatment of hides and skins when used alone and come into consideration only as assisting agents in the process of tanning with actual tanning agents like vegetable extracts. Many proposals have been made already in order to improve the tanning capacity of sulfite cellulose waste liquors by treating those liquors before their use, for instance with oxidizing agents or formaldehyde. However, even by such additional treatment no tanning agents could be hitherto obtained from sulfite cellulose waste liquors which were capable of tanning hides as effectively as the vegetable tannins like quebracho or chestnut extracts. Therefore, those products from sulfite liquors did not find very wide application in industry, as they too could only be used as tanning assistants, for instance in combination with vegetable tanning materials.

We have now found that excellent tanning agents, by which the vegetable tannins can be totally substituted, can be manufactured by treating sulfite cellulose waste liquors or the lignin sulfonic acid obtainable therefrom with a dihydroxy-diaryl sulfone and an aldehyde, the latter two components, if desired, being condensed in an alkaline solution before adding them to the sulfite liquor; however, in the latter case, a subsequent treatment of the condensation product of sulfite cellulose liquor with a further quantity of formaldehyde may be desirable.

Among the dihydroxy-diarylsulfones the dihydroxy-diphenyl sulfone may be mentioned as a suitable component for the reaction. Also substitution products thereof, for instance the sulfone being derived from phenol and cresol or the technical mixture of cresols or of m-cresol alone, come into consideration. Most suitable as aldehyde component are formaldehyde or substances yielding formaldehyde, as, for instance, p-formaldehyde, methylol compounds and the like.

The treatment of the lignin sulfonic acid solutions can be carried out in an acid, neutral or alkaline medium. As the chemical structure of lignin sulfonic acid is not yet exactly known and the reaction of the three components is a very complex one, no chemical formula can be given for the reaction product which can be defined therefore only by its method of preparation. The tanning properties of the condensation products depend somewhat on the conditions under which the condensation has been effected and also, if sulfite cellulose liquors have been used, on the origin and nature of the same. It is known that sulfite cellulose liquors, depending on the nature of the sulfite cellulose process they come from and on the further treatment they may have undergone, have somewhat different properties, for instance as regards the content of dry substance and ash and its composition. Sulfite liquors, which during their process of manufacture have been freed to some extent from calcium and ferric salts have proved to be especially suitable for the purpose of our invention. On the other hand, the amount of formaldehyde, which aldehyde we prefer to use as a condensing agent, is most advantageously so chosen, that a small excess remains after the reaction is completed; the relative proportions of the other reaction components may be varied within wide limits, however, a ratio of between about 2–4 parts of sulfite cellulose waste liquor (calculated on the dry weight) to about one part of the sulfone being preferred. Furthermore, the condensation should be continued and the temperature should be chosen such that the aqueous acid solution of the reaction product in the cold does not separate insoluble dihydroxy-diaryl sulfone in any appreciable amount; in most cases, a treatment for about 5–10 hours at temperatures of about 70–100° C. will be suitable for this end. These conditions, however, are given here only for example's sake and we wish it to be understood that they too can be varied within wide limits, still yielding products coming within the scope of our invention.

The tanning agents prepared according to our invention can be applied in the same way as the hitherto used vegetable tannins alone or in combination with other tanning materials like mineral salts, synthetic tanning assistants and so on. The leathers obtained by tanning with the present products are evenly and thoroughly tanned; they dry softly and are pliable without breaking. In all respects they are quite similar to those prepared with the aid of vegetable tannins from woods or barks, like quebracho extract. They are especially suitable for tanning heavy leathers, for instance those used in the manufacture of shoe soles. The tanning agents according to our invention are not washed out of the leather, even if the same is treated with water for a prolonged time. Moreover, the color of the resulting leather is very fast to the action of light.

The following examples illustrate the invention without limiting it thereto, the parts being by weight:

Example 1

124 parts of crude sulfite cellulose waste liquor of 35° Bé. (pH about 8);
24 parts of 4.4'-dihydroxy-diphenyl sulfone;
10 parts of formaldehyde are stirred for about 2-4 hours at 130° C. A brownish resin-like substance is obtained which can be salted out and is soluble in water. For tanning the product is diluted with water and the solution is acidified by addition of formic acid to a pH-value of about 3. Tanning is then carried out as usual.

Example 2

170 parts of sulfite cellulose waste liquor of 24° Bé. having a low ash content (pH about 4);
24 parts of 4.4'-dihydroxy-diphenyl sulfone;
10 parts of formaldehyde are stirred for 8 hours at about 90° C. The liquor separates into two layers, one being a viscous resin which is easily soluble in water and which, at a pH-value of about 3.5 shows a very favorable ratio of tanning matter and none-tanning matter, the other being a thin solution which, after establishing a suitable degree of acidity, also shows good tanning properties.

Example 3

24 parts of a condensation product obtainable by heating 100 parts of dihydroxy-diphenyl sulfone with 80 parts of a 40% sodium hydroxide liquor, 80 parts of water and 80 parts of technical formaldehyde and subsequent precipitation with hydrochloric acid solution, and
124 parts of crude sulfite cellulose waste liquor of 35° Bé. are mixed and the mixture is heated. Heating is continued until the water-insoluble condensation product is brought into solution and does no more separate an insoluble precipitate after cooling and acidifying. When tanning with this product at a suitable acidity, a bright pliant leather is obtained.

Instead of the above condensation product also a condensation product of dimethyl-dihydroxy-diphenyl sulfone with formaldehyde may be reacted with the sulfite cellulose waste liquor.

Example 4

910 parts of a sulfite cellulose waste liquor of 32° Bé. (pH about 8) from which the greater part of the calcium and ferric salts has been removed (Analysis: dry weight 56.5%; ash 10.2%; $Fe_2O_3$ 0.02%; CaO 0.19%; MgO 0.02%; $Na_2O$ 6.5%), and 230 parts of 4.4' dihydroxy-diphenyl sulfone are heated to about 100° C. whilst stirring. 125 parts of formaldehyde (30%) are added drop by drop during one hour at the said temperature whereafter the mass is heated for about 8 more hours to about 105-108° C. The reaction product which is still fluid at elevated temperatures solidifies on cooling to form a resin-like dark brownish mass which is easily soluble in water. By tanning with such solutions at a suitable acidity bright and well-filled leathers of good resistance to the action of light are obtained.

A more viscous product is obtained when the amount of formaldehyde is increased to about 190 parts.

Instead of 230 parts of the above sulfone also an equivalent amount of the sulfones from equal molecular quantities of phenol and cresol or from m-cresol respectively can be used for the preparation of a similar tanning agent.

We claim:

1. The process of preparing tanning substances which comprises reacting lignin sulfonic acid with a dihydroxy-diaryl sulfone and an aldehyde.

2. The process of preparing tanning substances which comprises reacting sulfite cellulose waste liquor with a dihydroxy-diarylsulfone and formaldehyde, until the reaction product is soluble in water.

3. The process of preparing tanning substances which comprises reacting sulfite cellulose waste liquor with a condensation product of a dihydroxy-diaryl sulfone and formaldehyde, until the reaction product is soluble in water.

4. The process of preparing tanning substances which comprises reacting sulfite cellulose waste liquor with a condensation product of a dihydroxy-diaryl sulfone and formaldehyde and treating the reaction product with a further quantity of formaldehyde, until the reaction product is soluble in water.

5. The process of preparing tanning substances which comprises reacting sulfite cellulose waste liquor with a dihydroxy-diphenyl sulfone and formaldehyde, until the reaction product is soluble in water.

6. The process of preparing tanning substances which comprises reacting purified sulfite cellulose waste liquor with a dihydroxy-diphenyl sulfone and formaldehyde, until the reaction product is soluble in water.

7. As a new product for use as a tanning substance, a reaction product of lignin sulfonic acid with a dihydroxy-diaryl sulfone and an aldehyde.

8. As a new product for use as a tanning substance, a water-soluble reaction product of sulfite cellulose waste liquor with a dihydroxy-diaryl sulfone and formaldehyde.

9. As a new product for use as a tanning substance, a water-soluble reaction product of sulfite cellulose waste liquor with a condensation product of a dihydroxy-diaryl sulfone and formaldehyde.

10. As a new product for use as a tanning substance, a water-soluble reaction product of sulfite cellulose waste liquor with a dihydroxy-diaryl sulfone and formaldehyde which reaction product has been aftertreated with a further quantity of formaldehyde.

11. As a new product for use as a tanning substance, a water-soluble reaction product of sulfite cellulose waste liquor with a dihydroxy-diphenyl sulfone and formaldehyde.

12. As a new product for use as a tanning substance, a water-soluble reaction product of sulfite cellulose waste liquor with 4.4'-dihydroxy-diphenyl sulfone and formaldehyde.

13. As a new product for use as a tanning substance, a water-soluble reaction product of sulfite cellulose waste liquor with a hydroxyphenyl hydroxytolyl sulfone and formaldehyde.

14. As a new product for use as a tanning substance, a water-soluble reaction product of purified sulfite cellulose waste liquor with a dihydroxy-diphenyl sulfone and formaldehyde.

15. As a new product for use as a tanning substance, a water-soluble reaction product of purified sulfite cellulose waste liquor with 4.4'-dihydroxy-diphenyl sulfone and formaldehyde.

HERMANN NOERR.
GUSTAV MAUTHE.